United States Patent Office 2,729,665
Patented Jan. 3, 1956

2,729,665

DICARBOXYLIC ACIDS AND THEIR DERIVATIVES AND PRODUCTION OF THE SAME FROM PARAFFIN WAX

John P. Buckmann, Yorba Linda, Calif., assignor to Union Oil Company of California, Los Angeles, Calif., a corporation of California No Drawing. Application March 17, 1952,
Serial No. 277,082

18 Claims. (Cl. 260—451)

This invention relates to new compositions of matter and particularly to complex mixtures of dicarboxylic acids and to the methods for the production of such mixtures of dicarboxylic acids. The invention relates further to mono- and dihydroxy alcohol esters of complex mixtures of dicarboxylic acids, which esters are suitable for use as resin plasticizers, lubricants and the like.

The invention relates more particularly to a method for producing high yields of dicarboxylic acids from refined paraffin wax, to the mixture of dicarboxylic acids thus produced and to esters of such dicarboxylic acids.

Although paraffin wax has been oxidized in the past at various temperatures and under various conditions of pressure, air-blowing rates, and the like, the products have consisted of monocarboxylic acids or of mixtures of mono- and dicarboxylic acids containing appreciable proportions of the monocarboxylic acids. Attempts to continue the oxidation to such an extent that the proportion of dicarboxylic acids is relatively high, and that the acid number of the oxidized product is over about 350 to 400 mg. KOH/g. have not been successful. In attempting to produce high yields of dicarboxylic acids it has been found that as the oxidation proceeds the acid number gradually increases to a point in the range of 350 to 400 mg. KOH/g. and continued oxidation leads to the formation of polymerized and/or resinified bodies, to darkening of the oxidation product, and to degradation of the acids already formed. Moreover, previously described processes result in the formation of oxidation products having relatively high saponification number-acid number ratios indicating the presence of relatively large proportions of esters or ester-like materials. It is apparent that derivatives made directly from such oxidation products contain large proportions of extraneous esters or ester-like materials which are in many cases undesirable in the derivatives so formed.

Thus, it is an object of this invention to provide a method for oxidizing paraffin wax to produce, in high yields, dicarboxylic acids which are relatively free from monocarboxylic acids as well as from esters, lactones, lactides, and the like, and thus which contain relatively high proportions of simple dicarboxylic acids.

It is a further object of this invention to provide mixtures of dicarboxylic acids containing from 4 to about 20 or 30 carbon atoms per molecule which mixtures are relatively free from nonacid constituents and from monocarboxylic acids and esters or ester-like compounds.

A further object of this invention is to provide esters of such mixtures of relatively pure dicarboxylic acids which esters have utility as plasticizers for synthetic resins, particularly polyvinyl resins, and/or as synthetic lubricants.

A further object of this invention is to provide a relatively cheap supply of mixtures of relatively pure dicarboxylic acids.

Other objects and advantages of this invention will be apparent as the description thereof proceeds.

The above and other objects are accomplished by oxidizing refined paraffin wax in the liquid phase by contacting the wax with air or other oxygen-containing gas under specified and controlled conditions of temperature, pressure and rate of blowing with air or other oxygen containing gas until the acid number of the oxidized product reaches at least about 490 mg. KOH/g. and preferably between about 500 and about 575 mg. KOH/g. The resulting oxidized material may be used per se or may be fractionated by one of the methods described herein and the acids or acid fractions thus obtained may be converted into esters having particular utility as plasticizers, lubricants, or the like. The oxidized product so obtained has utility not only in preparing esters but is useful as a chemical intermediate in the production of any compound or product requiring the use of dicarboxylic acids. Uses of dicarboxylic acids are well known and include their use in the preparation of polyamides with diamines.

The paraffin wax to be employed in the preparation of the mixed dicarboxylic acids is one having a melting point between about 90° F. and about 200 F. and preferably between about 120° F. and about 165° F. It must be relatively oil free and free from asphaltic and resinous materials. Suitable paraffin waxes are obtained from topped waxy residua by extraction with liquefied propane to separate asphaltic materials from the oil and subsequently chilling the deasphalted oil to crystallize wax which may then be separated from the propane-oil solution. The precipitated wax is freed from oil by dissolving it in a solvent such as methyl ethyl ketone and chilling the resulting solution to precipitate an oil-free wax. Such dewaxing and deoiling processes are well known and are described in U. S. Patent No. 2,229,658. Deoiled waxes obtained by other refining processes using other solvents or combinations of solvents are also satisfactory for use in the oxidation process of this invention. Such waxes comprise predominantly paraffinic and isoparaffinic hydrocarbons having between about 15 and 50 carbon atoms per molecule.

The conditions under which oxidation is effected are important and must be controlled within the limits indicated in order to obtain the particular dicarboxylic acid mixtures having the characteristics and advantages described herein. Oxidation is preferably effected in a stainless steel oxidation chamber although other corrosion-resistant vessels or vessels having corrosion resistant liners may be employed. The vessel must be capable of withstanding the pressures to be employed. In carrying out the oxidation, paraffin wax of the quality described is charged to the oxidation vessel and heated to a temperature between 210° F. and 260° F., the preferred temperature range being 240° F. to 255° F. Preferably a small amount of an oxidation catalyst will be added to the paraffin wax prior to the oxidation and in lieu of adding a catalyst a small amount of a previous oxidation product which has been found to be satisfactory may be added in order to reduce the normal induction period. When a temperature of at least about 210° F. and preferably 230° F. is reached, air or a gas containing free oxygen is blown into the wax. During the air blowing the pressure is maintained between normal atmospheric pressure and about 500 pounds' gage and preferably between about 80 and about 110 pounds' gage. The air blowing rate, which is extremely critical, is maintained between about 0.75 and about 1.25 standard cubic feet per minute per 100 pounds of wax at the start of the oxidation and this rate is gradually increased as the oxidation proceeds until it reaches a value between about 1.5 and about 2.0 standard cubic feet per minute per 100 pounds of charge at approximately 90 hours. This latter rate is maintained from 90 hours to the end of the oxidation. The time required to effect the desired oxidation is found to vary but will generally be between about 100 and about 200 hours.

It is extremely essential that the air entering the wax be dispersed in fine bubbles so that good contact of air and wax is obtained. This is suitably realized by blowing the air through a porous ceramic, glass, Alundum or stainless steel plate or disc positioned near the bottom of the oxidation vessel. Sintered stainless steel plates or diffusion discs and porous Alundum discs having pore sizes of between approximately 5 and 10 microns have been found to give exceptionally good results. During the oxidation, volatile materials carried out of the oxidation vessel with the spent air or other gas used for oxidation, are not returned to the oxidation unit. These volatile materials comprise mainly water and formic acid together with other partial oxidation products as for example lower molecular weight alcohols, ketones, esters and the like. Thus the oxidation is preferably effected without refluxing volatile products back to the oxidation unit.

The air-blowing rate indicated hereinabove is extremely important. Thus, it is found that if the air rate is too great i. e., is greater than the limits specified particularly during the initial part of the oxidation, the oxidation does not proceed in the manner desired. With higher air rates it is possible to obtain an acid number of 300 to 400 mg. KOH/g. but when the acid number reaches about this value further increase in acid number does not take place. Continued air blowing results in resinification and darkening of the oxidized product. Moreover, the temperature at which oxidation is effected must be maintained within the limits indicated. Thus, if oxidation is effected at temperatures below about 210° F. the acid number of the oxidized product when acid number increase ceases or becomes negligible is not in the desired range. Generally it is impossible to obtain acid numbers higher than about 300 to 400 mg. KOH/g. under such circumstances. Moreover, if during the period of oxidation the temperature of the wax being oxidized is permitted to rise about about 260° F. it is found to be impossible to obtain a product having the desired high acid number.

The time of oxidation is dependent upon conditions under which oxidation is effected and the time will vary depending upon how closely the critical conditions of oxidation are complied with. Although, as indicated above, the time usually varies between 100 and about 200 hours, generally if the conditions of oxidation are maintained in the optimum ranges, the oxidation will be complete in about 120 to about 160 hours. Although in certain instances products having acid numbers as high as 500 to 550 have been obtained using an oxidation time of as high as 200 to 250 hours, generally the character of the oxidation product is somewhat inferior when such long periods of oxidation are required in order to obtain the desired high acid number. The long heating periods appear to promote resinification.

Catalysts which may be employed and which serve to initiate the oxidation reaction include metal salts or soaps such as manganese naphthenate, manganese oleate, cobalt naphthenate, cobalt oleate and the corresponding lead soaps. Manganese naphthenate has been found to be eminently satisfactory as a catalyst for these operations. It is to be pointed out that catalysts are not essential since the wax may be oxidized without the use of catalyst. However, in this case the oxidation reaction is slow to start. The oxidation reaction may be initiated by means other than the use of catalysts, for example, the product of a prior oxidation if present in small amounts serves as an oxidation initiator. It is important, however, if the oxidation is to be initiated in this manner that the prior oxidized material to be used is one which was oxidized under the conditions set forth herein and which attained the high acid numbers described herein. Thus it has been found that if small amounts of previously oxidized paraffin wax which did not meet the specified requirements is present in the oxidizer, generally it will be impossible to effect oxidation to produce the desired high acid number of oxidized wax. Thus, if for some reason a given oxidation run results in a product which reaches a maximum acid number of less than about 490 mg. KOH/g. it is essential that the oxidation unit be completely cleaned before attempting to produce oxidized waxes having the characteristics desired. This can be done by washing the vessel with hot acetone then with aqueous sodium hydroxide followed by water washing until neutral. A second wash with acetone to dry the vessel is desirable. Other equivalent means may of course be used.

When samples of the oxidized product removed at intervals from the oxidation vessel indicate that the oxidation has proceeded to a sufficient degree, as indicated by an acid number of at least about 490 mg. KOH/g., and preferably that the oxidation has proceeded to a point where there is no further increase in acid number on continued air blowing and the acid number is at least 490 mg. KOH/g., the product is considered satisfactory. A typical oxidized wax will have an acid number of about 520 mg. KOH/g., a saponification number of about 650 mg. KOH/g., and will be of a light amber color. This typical oxidized wax will have a saponification number-acid number ratio of 1.25. This ratio, which indicates the proportion of esters or ester-like materials present in the oxidation product, has been found to vary from about 1.2 to 1.32 to 1 and generally will be in the range of 1.22 to 1.3 to 1. It is to be noted in this connection that oxidation products obtained from paraffin wax where the maximum acid number developed during the oxidation is about 450 or less will have saponification number-acid number ratios of at least about 1.65 and generally above about 1.7 to 1.

The term "acid number" as used herein represents the numerical value of the acidity and is determined by methods described in A. S. T. M. Standard on Petroleum Products and Lubricants. Acid numbers of the acidic fractions obtained by oxidation of paraffin wax are determined according to the method described in the October 1947 edition, page 639. Acid number determinations on esters produced herein are made according to the method described on page 425 of the November 1950 edition.

The term "saponification number" as used herein is the saponification equivalent as determined by the method described in A. S. T. M. Standards on Petroleum Products & Lubricants, November 1950, page 39. Both acid number and saponification number values are expressed in milligrams of KOH per gram of sample.

As indicated hereinabove the oxidized product obtained following the teachings of this invention may be used per se in the preparation of various derivatives including particularly esters, or it may be fractionated by any one of several procedures depending upon the characteristics desired in the resulting derivatives. Since the product as removed from the oxidation vessel contains small amounts of formic and other low molecular acid and nonacid materials it is sometimes desirable to remove these materials by a stripping operation prior to forming derivatives. By heating to temperatures of about 225–250° F. or by blowing with inert gas or both it is possible to volatilize formic acid and nonacidic materials such as esters boiling in the same temperature range as formic acid.

Where it is desired to obtain a more nearly pure dicarboxylic acid fraction for further processing the oxidation product may be stripped to a temperature of approximately 340–345° F. at about 2 mm. pressure. In this stripping operation all materials boiling below succinic acid such as low molecular weight monocarboxylic acids and nonacid materials are eliminated.

In case it is desired to recover the higher molecular weight dicarboxylic acids from the oxidation product for separate treatment, the oxidation product may be extracted with an aromatic solvent, for example, toluene or xylene, to separate those acids which are soluble in the solvent employed. This treatment results in the rejection of succinic acid, high molecular weight polymeric acids, ester acids and the like. This same treatment may be applied to the oxidized wax product which has first been stripped to eliminate low molecular weight components, and in such case it results in the separation of a fraction of high molecular weight dicarboxylic acids relatively free from low molecular weight di- and monocarboxylic acids as well as from nonacid materials, polymeric acids, ester acids and the like.

Another means of separating particular dicarboxylic acid fractions from the oxidation product involves the exhaustive extraction of the crude oxidized wax or one of the stripped oxidized waxes with hot water to obtain a water-soluble fraction comprising relatively pure dicarboxylic acids.

Liquid esters may be produced from the crude oxidized wax or from any of the fractions above indicated using mono- or dihydroxy alcohols. These alcohols will preferably contain from about 1 to about 24 carbon atoms per molecule and will include the alkyl alcohols such as methanol, ethanol, propanol, isopropanol, the butanols, pentanols, hexanols, heptanols, octanols, and the like up to and including the various higher molecular weight alcohols such as octadecanol and the like; cycloalkyl alcohols such as cyclopentanol and alkyl substituted cyclopentanol as for example, methylcyclopentanol, ethylcyclopentano, diethylcyclopentanol and the like, and cyclohexanol and the alkyl substituted cyclohexanols such as the methylcyclohexanol, dimethylcyclohexanol, ethylcyclohexanol and cyclopentanols and cyclohexanols having one or more alkyl substituents of such carbon atom content that the total carbon atom content of the molecule will vary from $C_9$ to $C_{20}$ or higher. In addition to the alcohols indicated, alcohols having aromatic hydrocarbon substituents, that is, the aralkyl alcohols may be employed, thus benzyl alcohol, phenyl stearyl alcohol and related alcohols may be used. The polyhydroxy alcohols which may be employed include the dihydroxy alcohols, i. e., the glycols, the trihydroxy alcohols, for example, glycerol, ethyltrimethylol, propane trimethylol, butane trimethylol, pentane trimethylol and similar alcohols and the tetrahydroxy alcohols such as for example, pentaerythritol. Glycols which are particularly suitable include ethylene glycol, diethylene glycol, triethyene glycol, thiodiethylene glycol, propylene glycol, dipropylene glycol, trimethylene glycol; the butylene glycols, as for example the butanediols-1,3; the pentanediols, particularly the -2,4 diol; hexanediol-2,5, 2-ethylhexanediol-1,3, 2-methylpentanediol-2,4, and 2-methoxymethyl-2,4-dimethylpentanediol-1,5 and the corresponding ethoxy derivatives. Higher molecular weight dihydroxy compounds up to and including octadecanediol-1,12, for example, have been found to produce liquid esters of desirable characteristics.

The esters are preferably prepared directly from the crude oxidate or a fraction thereof by reaction with the desired alcohol or mixture of alcohols in the presence of a catalyst. In some instances and particularly with the higher molecular weight alcohols and the poly alcohols it is sometimes desirable to first prepare the methyl ester and subsequently convert the methyl ester into the desired alcohol ester by an ester exchange reaction. In such case an ester exchange catalyst may be employed. Such catalysts include the alkali metal hydroxides, carbonates or alcoholates, alkaline earth metal oxides, hydroxides, carbonates, naphthenates or alcoholates, lead or tin oxides or soaps or the like. Magnesium methylate has been employed as the ester exchange catalyst with excellent results.

In the preferred method the esters are prepared by direct treatment of the crude wax oxidation product or a fraction thereof with the desired alcohol or mixture of alcohols. In general one equivalent of acid fraction based on acid number will be reacted with between 1.1 and 1.5 equivalents of the alcohol. The crude oxidate or fraction thereof is placed in a vessel fitted with a reflux condenser having a water trap in the reflux line and the desired alcohol is added along with ½ to about 2 volumes of naphtha, toluene or the like, which serves as a solvent and as a carrying agent or azeotroping agent for water produced during the esterification reaction. The mixture is heated and refluxed until the acid number of the product is 15 mg. KOH/g. or lower. In some instances it is possible to obtain acid numbers as low as 2 to 3 mg. KOH/g. without using unreasonably long esterification times. The esterification is considered complete when no further quantities of water are obtained in the water trap. During the esterification about 0.1% to about 1% by weight of a catalyst is employed. Catalysts which have been found to have utility in this process include zinc, aluminum, cadmium and tin chlorides, sulfuric acid, phosphoric acid, hydrogen chloride, ethane sulfonic acid, toluene sulfonic acid and the like. The salt-type catalysts, and particularly stannous chloride are the preferred catalytic agents. However, ethane and toluene sulfonic acids are particularly active in aiding the esterification reaction.

Following completion of the esterification reaction the product may be topped to remove solvent, i. e., naphtha or toluene or the like and may be further purified, if desired, particularly where special characteristics are desired. Thus, the product may be treated with diluted caustic or carbonate or bicarbonate solutions such as sodium carbonate or bicarbonate to extract the remaining acidic bodies. The material may be treated with clay, activated charcoal or other adsorbent treating agents to remove colored bodies and the like.

Removal of acid and color bodies is most readily effected by contacting the ester or preferably a naphtha or toluene solution of the ester with a porous weak-base anion exchange resin. Such resins are commercially available. Two that have been used with success are "Permutit DR," obtainable from Permutit Corporation, 330 West Forty Second Street, New York and "Duolite S-30" obtainable from Chemical Process Company, 901 Spring Street, Redwood City, California. Samples of esters which have been contacted with such resins have been found to have acid numbers of substantially zero and have a very light amber color. In this method of treatment any of the porous weak base anion exchange resins available on the market appear to be suitable. Since the available resins are generally designed for use in aqueous systems and are available as water wet materials they must be converted for the present use by activating the resin with aqueous sodium hydroxide solution containing approximately 5% sodium hydroxide or with an isopropanol solution of ammonia. When the resin is activated by treatment with sodium hydroxide it is preferably rinsed with distilled water until the pH of the effluent liquid is reduced to 8 or 9 and subsequently rinsed with about 2 bed volumes of a water miscible solvent such as a ketone or alcohol to remove water from the resin. Isopropanol is particularly satisfactory for this purpose. The resin is then rinsed with a low boiling naphtha to remove the water miscible solvent and is ready for use. Resins so prepared are found to selectively absorb the color bodies and acidic bodies from the esters and result in a reduction in acid number and in color improvement of the ester products. These resins are regenerated for use by treatment with aqueous sodium hydroxide as above described or they may be regenerated by treatment with alcoholic ammonia followed by washing with a low boiling naphtha.

Certain of the esters produced as hereinabove described, i. e., those produced using branched chain saturated aliphatic monohydroxy alcohols having 5 to 12 carbon atoms per molecule are found to be oily liquids having an extremely high viscosity index and extremely low pour point, and these esters have particular utility as synthetic lubricating oils for jet type aircraft engines, as hydraulic fluids where temperatures of use may vary to as low as −50° F. to −75° F., and as lubricants for special purposes.

The term "pour point" as used herein is the temperature in ° F. at which the material will flow and is determined by the method described in A. S. T. M. Standard on Petroleum Products and Lubricants, November 1950, page 50.

The esters of this invention are compatible with and may be used in combination with many different natural and synthetic resins to produce plasticized resins. The plasticizing effect is particularly pronounced in the polyvinyl resins as, for example polyvinyl chloride, polyvinyl acetate, polyvinyl alcohol, polyvinyl butyral, polyvinyl formal resins and the various copolymers of these vinyl compounds. In this case the esters are completely compatible and do not have a tendency to migrate during aging. The mixture of polyvinyl compounds and esters is stable during heat processing and does not degenerate during outdoor exposure. The plasticized resins are resistant to water extraction, are light colored and have the desired resiliency, pliability, low temperature flexibility, etc. desired in these resins. The amount of ester to be employed will vary over a relatively wide range, however, an amount between about 5% and 100% by weight based on the polymer will generally be employed. The amount will depend, of course, upon the characteristics of the particular ester to be employed. Smaller amounts of low molecular weight aliphatic esters will produce considerable plasticizing effect; whereas, larger amounts of the polyhydric alcohol esters may be incorporated without producing too much softening of the resin. Because rather high percentages of the polyalcohol esters may be employed, these esters may be considered not only as plasticizing agents but also as extenders, and because of the relatively low cost of these ester materials, their use in large proportions is advantageous from an economical point of view.

The esters of this invention may be incorporated into the resin compositions by conventional processes such as by milling or by dissolving or dispersing the polymer and plasticizer in a solvent and evaporating the solvent.

When incorporating the plasticizers into polyvinyl resins, for example, a mixture of the polyvinyl resin and the ester is preferably milled on a two roll mill with the rolls heated to a temperature in the range of 265–285° F. The resulting plasticizing resin may be molded in the usual manner. Some of the esters described herein, and particularly those produced using straight chain aliphatic acids of 9 to 20 or more carbon atoms per molecule, and some of the esters produced with polyhydric alcohols are suitable for use as lubricants where high temperature characteristics, i. e., low volatility, high flash and fire points and high viscosity index is desirable. These esters produced with polyhydroxy alcohols have viscosities ranging from as low as 5 centistokes at 100° F. to as high as 2,000 centistokes at 100° F. and thus have utility in internal combustion engines, gear boxes, and the like. Where the ester is designed for use in gear lubrication it is sometimes desirable to incorporate extreme pressure agents and anti-wear agents. Extreme pressure agents such as sulfurized fatty oil and phosphosulfurized fatty oils are miscible with these esters and perform the desired function. Anti-wear agents, as for example, the organic phosphates such as tricresyl phosphate are found to impart anti-wear characteristics to these esters.

Since many of the esters of this invention, and particularly those prepared using monohydroxy alcohols and mixtures of monohydroxy alcohols and dihydroxy alcohols, are compatible with mineral lubricating oils their use in admixture with mineral lubricating oil as lubricants for aircraft engines, automotive engines and other lubricating purposes is feasible. Thus, it is possible to modify the pour point, viscosity and volatility characteristics of mineral lubricating oil fractions by the incorporation of various proportions of the esters. Blends containing from 5 to 75 or more per cent by weight of esters in mineral lubricating oil are found to be desirable lubricants for various purposes.

Moreover, the esters themselves and mixtures of esters with lubricating oils may be converted into greases by dissolving various proportions of metal soaps in the esters or mixed oils or by incorporating various proportions of powdered silica aerogel, alkyl ammonium bentonites, or the like in such oils. The resulting greases have the advantages of low temperature acceptability. Thus they are usable at temperatures as low as −50° F. to −75° F. or even lower, and yet are serviceable at elevated temperatures making them suitable for use as aircraft lubricants.

The following examples will serve to illustrate the invention but are not to be taken as limiting the broader aspects of this invention. In these examples the colors of the various products are referred to as Gardner colors. These colors were determined according to the method described in "Physical and Chemical Examination of Paints, Varnishes, Lacquers and Colors," Henry A. Gardner, seventh edition, 1935, page 191.

*Example I*

Approximately 14,000 grams of a refined paraffin wax having a melting point of about 145° F. and 80 grams of manganese naphthenate were charged to a stainless steel oxidation vessel provided with heating and cooling coils and with means for introducing and dispersing air at a point near the bottom of the vessel. A sintered stainless steel disc having a pore size of approximately 10 microns was used as a means of obtaining a fine distribution of air in the mass being treated. The wax was heated to a temperature of 220° F. at a pressure of 100 pounds gauge, and air was introduced into the oxidation vessel at the rates shown below. The air rates shown are expressed in standard cubic feet per minute per 100 pounds of wax charge.

| Hours | Air Blowing Rate, Std. Cu. Ft./Min./100 lbs. Wax |
| --- | --- |
| 0–30 | 1.04 |
| 30–40 | 1.17 |
| 40–50 | 1.27 |
| 50–70 | 1.46 |
| 70–90 | 1.69 |
| 90–End of run | 1.79 |

Acid number determinations were made on samples of the oxidized wax removed at intervals during the period of oxidation and the results of these tests were as follows:

| Hours | Acid No., mg. KOH/g. |
| --- | --- |
| 43 | 184 |
| 74 | 403 |
| 98 | 507 |
| 105 | 511 |
| 124 | 499 |

It will be observed that the acid number reached a maximum and started to decrease before air blowing was discontinued. The product consisted of liquid acids and a relatively large quantity of solid acids which separated from the liquid acids on cooling. The solid acids were very light in color and the liquid had a light amber color. This product appeared to be satisfactory as indicated by acid number and saponification number data. The saponification number was 625 mg. KOH/g. and the saponification number-acid number ratio was 1.26. The yield amounted to 12,725 grams or about 91% based on the wax charged to the oxidizer.

A representative sample of the cooled oxidized wax was centrifuged to separate the solid acids from the liquid acids. The solids separated in this manner amounted to 23.5% by weight of the crude product.

Approximately 4000 grams of the oxidation product of 499 acid number was stripped by heating to a temperature of 345° F. at 2 mm. pressure. The product had an acid number of 480 mg. KOH/g., a saponification number of 600 mg. KOH/g., and a saponification number-acid number ratio of 1.25.

*Example II*

Approximately 14,000 grams of a refined paraffin wax having a melting point of about 145° F. and 80 grams of manganese naphthenate were charged to a stainless steel oxidation vessel of the type described in Example I. In this case an automatic temperature control maintained temperatures during the oxidation at approximately 250° F., the maximum variation being between 248° F. and 255° F. The pressure was maintained at approximately 100 pounds gauge. The air blowing rate was started at .65 standard cubic foot per minute and was gradually increased as the run progressed until the rate of 1.95 standard cubic feet per 100 pounds of charge was being used at the end of the oxidation. The air blowing was continued for a total of 139 hours at which time the product had an acid number of 569 mg. KOH/g. and a saponification number-acid number ratio of 1.25. The yield in this case amounted to 10,800 g. This product was extremely light in color (Gardner color 6 on a filtered sample) indicating the absence of polymerization and resinification during the oxidation. The viscosity of a filtered sample was 52.3 centistokes at 100° F. and 6.82 centistokes at 210° F. The product had a viscosity index of 91. The solid acids separated by centrifuging a portion of the oxidized product amounted to 25% by weight and after washing with toluene amounted to 19% by weight of the crude oxidation product. The washed material had a melting point of 328–345° F.

*Example III*

Approximately 14,073 grams of refined paraffin wax having a melting point of about 143–150° F. and 80 grams of manganese naphthenate was oxidized in the oxidation vessel employed in Example I. The temperature was maintained as nearly as possible at 250° F. and the maximum variations were between 212° F. and 256° F. During the major portion of the run, which was continued for a total of 143 hours, the maximum temperature variation was between 245° F. and 252° F. The air-blowing rates employed during the run were the same as those employed in Example I.

Acid number determinations made on samples of the oxidized wax removed at intervals during the period of oxidation and the results of these tests were as follows:

| Hours | Acid No., mg. KOH/g. |
| --- | --- |
| 72 | 321 |
| 90 | 419 |
| 115 | 515 |
| 123 | 539 |
| 139 | 551 |
| 143 | 576 |

The product was of a light amber color and had a saponification number of 720 and a saponification number-acid number ratio of 1.25. The yield was 12,000 grams.

*Example IV*

An oxidation run was carried out on 14,000 grams of purified paraffin wax having a melting point of 143–150° F. using 80 grams of manganese naphthenate as catalyst. The temperature was maintained between 220° F. and 250° F. and throughout the major portion of the run the temperature varied between 240° F. and 250° F. Air rates employed were identical with those used in Example I. Oxidation was continued for 134 hours at which time the acid number was 518 mg. KOH/g. and samples taken at intervals toward the end of the oxidation showed 507 mg. KOH/g. at 103 hours and 514 mg. KOH/g. at 111 hours. The product which amounted to 13,308 grams or approximately 95% based on the wax charge, had an extremely good color, a low viscosity, a saponification number of 648 mg. KOH/g., and a saponification number-acid number ratio of 1.25.

A portion of the above oxidate was stripped to remove materials boiling below the boiling point of succinic acid. This was accomplished by heating to a temperature of 347° F. at 5 mm. pressure. The topped or stripped oxidate had an acid number of 481, a saponification number of 605 and a saponification number-acid number ratio of 1.26. The material removed by distillation had an acid number of 629, a saponification number of 738 and a saponification number-acid number ratio of 1.17.

*Example V*

An oxidation run was carried out on 14,000 grams of 145° F. melting point refined paraffin wax using the conditions described in Example I. The time of air blowing was approximately 140 hours, and the product had an acid number of 550 mg. KOH/g. and a saponification number of 686 mg. KOH/g. This product consisted of a slurry of white crystals in a yellow oil of Gardner color 6.

A portion of the product was filtered at room temperature through a Büchner funnel. The unwashed filter cake of crude solid acids amounted to 31.3% of the crude oxidation product.

A second portion of oxidation product was filtered through canvas in a centrifugal filtration unit at 3500 R. P. M. using an 11 inch diameter basket (relative centrifugal force of 1900). This method gave more rapid filtration and a filter cake which contained less of the liquid acids. The yield of unwashed, solid acids amounted to 24.8% by weight of the original oxidized wax. This crude solid acid material had a melting point between about 286–315° F. The crude filter cake was repulped in an equal weight of toluene, filtered by suction and air dried to give a product melting between about 328° F. and 343° F. in a yield of 18% by weight based on the crude oxidation product. A single recrystallization from hot water raised the melting point of this product to approximately 360–368° F. This material is relatively pure succinic acid.

*Example VI*

An oxidation run was made to produce an oxidized product of relative low acid number for purposes of comparison with the products of this invention. In this case 14,000 grams of 143–150 melting point paraffin wax was oxidized under the conditions set forth in Example I for a total of 94 hours. At this time the product had an acid number of 382 mg. KOH/g., a saponification number of 535 mg. KOH/g., and a saponification-number-acid number ratio of 1.40. Before removing the product from the oxidizer it was blown with nitrogen at atmospheric pressure to remove formic acid and the resulting product had an acid number of 379 mg. KOH/g.

This product was light amber in color and when cooled contained small quantities of white crystalline acids. The preparation of an ester from this oxidized product and the characteristics of this ester are shown in Example XXVI.

*Example VII*

The following oxidation run was made with an unrefined paraffin wax. The wax had a melting point of 180–190° F. and was dark brown in color. Analysis showed it to contain 0.11% sulfur, 0.025% nitrogen and approximately 0.6% oxygen.

Approximately 13,170 grams of the above wax and 80 grams of manganese naphthenate was charged to the oxidizer described in Example I. The temperature was maintained between 230 and 254° F. and during the greater portion of the time was at or near 250° F. The air-blowing rate was the same as that employed in Example I. The oxidation was continued for a total of 102 hours at which time the product had an acid number of 7.8 mg. KOH/g. and was extremely dark brown in color.

*Example VIII*

The following oxidation run was made in the oxidizer immediately following the run described in Example VII to show the inhibiting effect of small amounts of unrefined wax and/or oxidized unrefined wax on refined paraffin wax. Following the completion of the run described in Example VII the oxidizer was permitted to drain while hot so that the only material remaining in the oxidizer was that which did not drain from the oxidizer. The following run was made without cleaning the oxidation vessel:

To the vessel was charged 14,000 grams of refined paraffin wax having a melting point of 143–150° F. and 80 grams of manganese naphthenate. The temperature was maintained at approximately 250° F. and varied from 250 to 254° F. during the run. The air-blowing rate employed was the same as that used in Example I. The results of acid number determinations on samples removed at intervals during the oxidation were as follows:

| Hours | Acid No., mg. KOH/g. |
|---|---|
| 35 | 167 |
| 68 | 206 |
| 108 | 353 |
| 132 | 238 |

It is apparent that the above product is not satisfactory and does not meet the requirements for the acids of this invention. This product was a very dark brown sticky tar indicating that the course of the reaction appeared to change after an acid number of around 350 had been reached so that the resulting product was highly resinous and contained resin bodies and polymers in large proportions.

*Example IX*

Following the oxidation run described in Example VIII the oxidizer was drained and cleaned by washing with naphtha in order to remove as nearly as possible all traces of the poorly oxidized wax obtained in Example VIII. To the clean vessel was charged 14,000 grams of refined paraffin wax having a melting point of 143–150 and 80 grams of manganese naphthenate and the oxidation of this material was effected at temperatures between 235 and 248° F. The air rate employed was the same as that described in Example I and the oxidation was continued for 122 hours. At this time the acid number of the product was 327 but the oxidized material was dark brown and extremely viscous indicating that the product contained high proportions of polymers and resinous bodies. This product was considered unsatisfactory and the oxidation was therefore not continued beyond 122 hours.

Following this run the oxidizer was again cleaned by washing with acetone and caustic followed by water and acetone, and subsequent runs made in the clean unit gave satisfactory products.

*Example X*

The following run was made to show the effect of high air blowing rates on the course of the oxidation. In this case 10,000 grams of refined paraffin wax having a melting point of 143–150° F. and 56 grams of manganese naphthenate were charged to the oxidizer and the oxidation was effected at temperatures of approximately 250° F. with a maximum variation between 230° F. and 258° F.

The air blowing rates employed were as follows:

| Hours | Air Blowing Rates, Std. Cu. Ft./Min./100 lbs.Wax |
|---|---|
| 0–45 | 1.77 |
| 45–52 | 2.95 |
| 52–200 | 3.63 |
| 200–245 | 2.5 |

The results of acid number determinations made on samples of the oxidized wax removed from the oxidizer during the period of oxidation were as follows:

| Hours | Acid No., Mg. KOH/g. |
|---|---|
| 45 | 228 |
| 93 | 331 |
| 130 | 347 |
| 179 | 381 |
| 213 | 400 |
| 245 | 412 |

It will be noted that although the acid number was still increasing when the oxidation was discontinued the rate of increase was extremely low and it appeared that it would be impossible to obtain an acid number as high as 490 because the product had become dark and was very viscous indicating that polymerization and resinification were taking place. This product is not satisfactory and the run shows that high air rates, and particularly high initial air rates change the course of the oxidation and prevent the production of high acid number products.

*Example XI*

The following example shows the effect of permitting the temperature to rise above about 260° F. during the course of the oxidation. In this instance the wax charge and air blowing rates were the same as those employed in Example II and the oxidation was continued in the same manner as Example II up to 50 hours. At this time the automatic temperature control failed and the temperature gradually rose from about 250° F. to 280° F. at about 60 hours and 325° F. at 67 hours at which time the oxidation was discontinued. The product had an acid number of 280 mg. KOH/g. and was extremely dark and viscous. It was completely unsatisfactory for the purposes of this invention.

*Example XII*

The example shows the effect of permitting the temperature to rise above about 260° F. during the course of oxidation. In this case the temperature was permitted to rise to 290° F. for a short period of time and was then reduced to the desired range and the oxidation continued.

Approximately 14,000 grams of 143–150° F. melting point refined paraffin wax was oxidized using the air blowing rates set forth in Example I. Data regarding the temperature of operation and acid number of the material being oxidized are presented below:

| Hours | Air Blowing Rate, S. C. F./ Min./100 lbs. | Temperature, ° F. | Acid No., mg. KOH/g. |
|---|---|---|---|
| 20 | 1.04 | 235 | |
| 23 | 1.04 | 270 | |
| 25 | 1.16 | 290 | |
| 38 | 1.16 | 241 | |
| 86 | 1.68 | 236 | 288 |
| 114 | 1.78 | 250 | 326 |
| 139 | 1.78 | 232 | 361 |
| 163 | 1.78 | 234 | 391 |
| 175 | 1.78 | 244 | 404 |

The oxidized product amounted to 13,800 grams of a material having a very dark brown color. This material had an acid number of 404, a saponification number of 647, and the saponification number-acid number ratio was 1.6. After permitting the succinic acid and other solid low molecular weight dicarboxylic acids to separate the supernatant oil had a kinematic viscosity of 251.4 centistokes at 100° F., 16.25 at 210° F. and a viscosity index of 65. The Gardner color of this oil was 17.

Example XIII

An isoamyl ester of the crude oxidized wax obtained in Example II was prepared using a mixture of 801 grams of the oxidized wax having an acid number of 569 mg. KOH/g., 890 grams (25% excess) of isoamyl alcohol (largely 3-methyl-1-butanol) 5 grams of stannous chloride dihydrate and 500 ml. of naphtha. This mixture was heated in a flask fitted with a reflux condenser having a water trap in the condensate return line to a temperature at which refluxing occurred. During the esterification the temperature of the reaction mixture varied from 212° C. to 260° C. After heating for 16 hours the total volume of 162 ml. of water had collected in the water trap and the product had an acid number of 19.5 mg. KOH/g. At this time one gram of ethane sulfonic acid was added and the esterification continued for an additional 4½ hours. The total yield of water was 169 ml. and the final temperature was 285° F. The resulting product was cooled, diluted with an equal volume of a low boiling paraffinic solvent and percolated through a column of decolorizing resin activated by sodium hydroxide using the procedure disclosed hereinabove. The effluent was stripped free of solvent in a vacuum evaporator and finished by heating to a bottoms temperature of 320° F. at 2 mm. pressure. The bottoms product consisting of the isoamyl ester of mixed dicarboxylic acids was a light brown fluid oil. After filtration through diatomaceous earth this ester had an acid number of 1.3, a Gardner color of 12, a viscosity index of 111, a kinematic viscosity of 9.26 centistokes at 100° F. and a pour point of −92° F.

Example XIV

An ester was prepared using the crude wax oxidation product of Example II and 2-methylpentanol. In this case a mixture of 1580 grams of the oxidized wax, 2007 grams (25% excess) of 2-methyl pentanol, 6 grams of ethane sulfonic acid and 2,000 ml. of petroleum naphtha was heated and refluxed through a water trap for 12 hours. The reaction temperature ranged from about 210° F. to 255° F. and a total volume of 332 ml. of water was collected in the water trap. The acid number of the crude ester so obtained was 4.6 mg. KOH/g. and the Gardner color was approximately 9. The crude product was decolorized and finished as in Example XIII and the final product was a light yellow oil having an acid number of 0.61 mg. KOH/g., a Gardner color of 7, a viscosity index of 96, a pour point of −95° F., a flash point of 330° F. and a kinematic viscosity at 100° F. of 9.10.

Example XV

An ester of the acid mixture obtained in Example II was prepared using 3,7-dimethyloctanol. The alcohol was prepared from commercially pure citronellal by hydrogenation over Rufert nickel catalyst at 167° F. under an initial hydrogen pressure of 1890 pounds per square inch gauge pressure. The catalyst was removed by filtration and the resulting alcohol recovered by vacuum distillation. A selected cut boiling between 237.2° F. and 240.8° F. at 20 mm. pressure was used for the esterification.

A mixture of 173 grams of the product of Example II having an acid number of 569,347 grams (25% excess) of 3,7-dimethyl octanol, 2 grams of stannous chloride dihydrate and 400 ml. of a paraffinic naphtha boiling between about 200° F. and about 300° F. was heated under a reflux condenser for a total of 11½ hours. The temperature ranged from about 217° F. to about 302° F. during this treatment. A total of 41.5 ml. of water was recovered from a water trap in the reflux line. The crude reaction product which had an acid number of 5.1 was diluted with two volumes of a low boiling paraffinic naphtha and percolated through a decolorizing resin column which had been activated by sodium hydroxide as described herein. The effluent from the resin column was stripped free of solvent, distilled under a vacuum of 2 mm. of mercury to a bottoms temperature of 320° F., and this stripped material was then filtered through diatomaceous earth for clarification. A light brown ester oil was obtained in a yield of 300 grams. This product had a pour point of −85° F., a kinematic viscosity of 17.6 centistokes at 100° F., an acid number of 2.8 mg. KOH/g., and a Gardner color of 10.

Example XVI

The 2-ethylhexyl ester of wax acids was prepared by refluxing a mixture of 4072 grams of the product of Example II, 6610 grams (25% excess) of 2-ethyl hexanol, 50 grams of stannous chloride dihydrate and 4,000 ml. of a paraffinic naphtha boiling between about 200° F. and 300° F. Heating and refluxing was continued for 27 hours at which time a total of 854 ml. of water was recovered. The product had an acid number of 5.7 and a Gardner color of 11. The product was purified and decolorized as in Example XV. The product amounted to 6,100 grams and had an acid number of 0.36 mg. KOH/g., a Gardner color of 5, a pour point of −95° F., a viscosity at 100° F. of 10.2 centistokes and a viscosity index of 103.

Example XVII

A 2-ethyl hexyl ester was prepared from toluene-soluble acids recovered from an oxidized paraffin wax having an acid number of 501. The toluene-soluble fraction of oxidized wax was prepared by extracting 652 grams of crude oxidized wax having an acid number of 501 at room temperature with three successive one liter portions of toluene. The combined toluene extracts were filtered and the major part of the solvent removed by evaporation. Approximately 476 grams of a clear pale orange oil of 260 acid number was obtained. This product was reacted with 350 grams (23% excess) of 2-ethyl hexanol in the presence of 1.5 grams of stannous chloride dihydrate and 500 ml. of a petroleum naphtha. Esterification was continued for 17½ hours at a temperature ranging from about 285° F. to about 324° F. at which time a total of 43 ml. of water had been recovered in the water trap. This product was decolorized and finished as described in Example XV. The yield was 338 grams of a material having an acid number of 1.5, a viscosity index of 118 and a pour point of −90.

Example XVIII

Approximately 230 grams of the stripped acids prepared in Example IV and having an acid number of 481, 317 grams of methylcyclohexanol, and 1.5 grams of stannous chloride dihydrate and 250 ml. of a paraffinic naphtha boiling between about 200° F. and 300° F. was heated and refluxed at a temperature between 275° F. and 420° F. for 14 hours. The product was decolorized and finished as described in Example XV. This product had a pour point of −15° F., an acid number of 2.0 mg. KOH/g., a kinematic viscosity at 100° F. of 41.9 centistokes, and a viscosity index of 99.

Example XIX

Approximately 230 grams of the stripped oxidized paraffin wax produced in Example IV and having an acid number of 481 was extracted three times with 500 ml. portions of water at a temperature of about 190–200° F. The combined hot water extracts were concentrated to a volume of about 450 ml. and mixed with 250 grams of 2-ethylhexanol, 1.5 grams of stannous chloride dihydrate and 250 ml. of paraffinic naphtha. The resulting mixture was refluxed through a water trap until no further quantities of water were collected in the trap. At this time the temperature of the reaction mixture had reached 285° F. The crude ester was decolorized and finished in the manner described in Example XV, and there was obtained 267 grams of a clear light colored oil having a pour point of —95° F., an acid number of 0.23, a Gardner color of 4 and a viscosity index of 97.

*Example XX*

A mixture of 155 grams of oxidized paraffin wax produced in Example II and 49 grams of ethylene glycol was heated in a distilling flask connected to a short fractionating column fitted with a total take-off head. The mixture was stirred throughout the esterification by bubbling carbon dioxide through the reaction mixture. After four hours at a reaction temperature of between 400° F. and 428° F. 33 ml. of water had been collected in the distillate. At this point the system was evacuated to a pressure of 1.5 mm. and maintained at this pressure and at a temperature of 428° F. for an additional two-hour period at which time the product was cooled to room temperature. The ester product was very viscous and slightly turbid. It was dissolved in 3 volumes of acetone, heated to about 135° F. with a small amount of activated charcoal and filtered through an activated filtering clay. The solvent was then removed by air blowing on a steam bath. This product was a clear viscous oil having a Gardner color of 16.

*Example XXI*

A mixture of 614 grams of the oxidized paraffin wax produced in Example II, and 460 grams of dipropylene glycol was esterified as in Example XX to produce 744 grams of turbid viscous oil. This product was soluble in benzene, acetone, and isopropyl alcohol but insoluble in mineral oil and paraffin hydrocarbon solvents. The average molecular weight as determined in benzene was 885 and the acid number of this product was 18 mg. KOH/g. To 173 grams of the above product was added 6.5 grams of dipropylene glycol and the above esterification repeated with a final heating of 8 hours at 1.5 mm. pressures and temperatures of between about 390° F. and 428° F. The resulting product was more viscous and had an acid number of 7.8 mg. KOH per gram. The average molecular weight of this product as determined in benzene solution was 1365. Its solubility in solvents was not appreciably changed.

*Example XXII*

A mixed ester was prepared by reacting 139 grams of a topped filtered oxidized paraffin wax, 15.5 grams of ethylene glycol, 85 grams of 3,5,5-trimethylhexanol and 3.5 grams of stannous chloride dihydrate in 50 ml. of paraffinic naphtha. The oxidized wax employed was one having an acid number of 520, a saponification number of 650 and a saponification number-acid number ratio of 1.26. The stripped and filtered wax had an acid number of 404 mg. KOH/g. Esterification was effected by heating at a temperature between about 250° F. and 320° F. under a reflux condenser with a water trap in the reflux line. Heating and refluxing was continued for a total of 12 hours and at this time a total of 25.5 ml. of water was recovered. The product was percolated through a weak base anion exchange resin and filtered through filtering clay. This material had a viscosity index of 124, a pour point of —50 and an acid number of 17.4.

*Example XXIII*

A mixed ester was prepared using 139 grams of the stripped and filtered oxidized paraffin wax described in Example XXII, 26 grams of pentamethylene glycol, 85 grams of 3,5,5-trimethylhexanol and 0.5 gram of stannous chloride dihydrate in 50 ml. of a paraffinic naphtha boiling between about 200° F. and about 300° F. Esterification was effected in about the same manner as that described in Example XXII except that heating was continued for a total of about 15 hours. The product was dissolved in a low boiling paraffinic naphtha and the naphtha solution percolated through an anion exchange resin (Duolite S-30). The product after topping to remove solvent had a viscosity index of 128, a pour point of —40° F. and an acid number of 7.8 mg. KOH/g.

*Example XXIV*

Example XXIII was repeated using trimethylene glycol in place of pentamethylene glycol. This product had a viscosity index of 130 and a pour point of —30. The acid number was 15.

*Example XXV*

A mixed ester was prepared using 111 grams of the stripped and filtered oxidized paraffin wax described in Example XXII, 94 grams of a propylene glycol polymer of approximately 475 molecular weight containing two primary hydroxyl groups per molecule and 65 grams of 2-ethylhexanol. The catalyst employed was 0.5 gram of stannous chloride dihydrate and the reaction was effected in solution in paraffinic naphtha boiling between about 200° F. and about 300° F. Heating and refluxing was continued for a total of about 14 hours at a temperature between 270° F. and 355° F. The product after percolation through an anion exchange resin (Permutit DR) had a pour point of —45° F., a viscosity index of 132, a kinematic viscosity of 100° F. of 58.5 and an acid number of 3.9.

*Example XXVI*

An ester was prepared using the low acid number oxidized wax product of Example VI. This oxidized material had an acid number of 379 mg. KOH/g., a saponification number of 535 mg. KOH/g. and a saponification number-acid number ratio of 1.40 and thus was not a material having the high acid number and low saponification number-acid number ratio typical of products of this invention. This example shows the inferior quality of esters produced with the low acid number product.

A mixture of 149 grams of the oxidized wax of 379 acid number, 162 grams (25% excess) 2-ethylhexanol, 0.5 gram of stannous chloride dihydrate and 50 ml. of paraffinic naphtha was heated for 13 hours at a temperature ranging between 240° F. and 355° F. under a reflux condenser with a water trap. A total of 27 ml. of water was produced during the esterification. The crude product was dark in color. After decolorizing as described in Example XIII and distilling the product at 1.7 mm. Hg pressure to a bottoms temperature of 400° F. this ester had a pour point of —10° F., a kinematic viscosity at 100° F. of 16.5, an acid number of 1.7 mg. KOH/g. and a Gardner color of 15.

It is to be noted that the 2-ethylhexanol esters of high acid number oxidized wax products had pour points of —95° F. (Example XVI), —90° F. (Example XVII) and —95° F. (Example XIX) making these latter esters suitable for use as low temperature lubricants whereas the corresponding ester of low acid number wax oxidate is not suitable for such use.

*Example XXVII*

A mixture of approximately 250 grams of oxidized wax produced in Example II having an acid number of 569, 318 grams of 2-ethylbutanol, 0.5 gram of stannous chloride dihydrate and 200 ml. of paraffinic naphtha was refluxed for 15 hours at a temperature ranging from about 215° F. to about 310° F. Water produced during the esterification was removed by means of a water trap. The crude ester was decolorized using the method described in Example XV and the product had a kinematic viscosity at 100° F. of 18.2 centistokes, a viscosity index of 131 and a pour point of —40° F.

*Example XXVIII*

Example XXVII was repeated using an equivalent weight of phenyl stearyl alcohol in place of the 2-ethylbutanol. In this case refluxing was continued for 20 hours at a temperature varying between 220° F. and 345° F. The crude product, after decolorizing as described in Example XV had a kinematic viscosity at 100° F. of 168 centistokes, a viscosity index of 90 and a pour point of +15° F.

I claim:

1. A method for the treatment of paraffin wax to produce a mixture of dicarboxylic acids which comprises oxidizing a refined paraffin wax, having between about 15 and about 50 carbon atoms per molecule and a melting point between about 90° F. and about 200° F. by blowing said wax with a gas containing free oxygen at a pressure between normal atmospheric pressure and 500 pounds per square inch gage and a temperature between about 210° F. and about 260° F. until the oxidized product has an acid number between about 490 and about 575 mg. KOH/g., the rate of said blowing being initially between 0.75 and 1.25 standard cubic feet per minute per 100 pounds of wax and being increased to between 1.5 and 2.0 standard cubic feet at the end of the period of oxidation.

2. A process for the production of dicarboxylic acids from paraffin wax which comprises oxidizing a refined paraffin wax containing between about 15 and about 50 carbon atoms per molecule at a pressure between normal atmospheric pressure and 500 pounds per square inch gage and a temperature between about 210° F. and about 260° F. by blowing said wax with a gas containing free oxygen until the acid number of the product is between about 490 and about 575 mg. KOH/g., the rate of blowing being initially between about 0.75 and about 1.25 standard cubic feet per minute per 100 pounds of wax and being increased during the period of oxidation until it is between about 1.5 and about 2.0 standard cubic feet per minute per 100 pounds of wax after 90 hours, and maintaining said last named rate to the end of the period of oxidation.

3. A process according to claim 2 in which said paraffin wax has a melting point of about 143–150° F.

4. A process according to claim 2 in which the oxidation temperature is maintained between about 230° F. and 250° F.

5. A process for the production of a mixture comprising dicarboxylic acids, said mixture having an acid number between about 490 and about 575 mg. KOH/g. and a saponification number-acid number ratio between about 1.2 and about 1.32 to 1 which comprises air blowing a refined paraffin wax having a melting point between about 120° F. and about 165° F. at a temperature between about 210° F. and about 260° F. until the acid number of the oxidized wax is at least 490 mg. KOH/g., the air blowing rate being initially between about 0.75 and about 1.25 standard cubic feet per minute per 100 pounds of wax, said rate being increased as the oxidation proceeds until at 90 hours the rate is between about 1.5 and about 2.0 standard cubic feet per minute per 100 pounds of wax and maintaining said last named rate until the oxidation is completed.

6. A process according to claim 5 in which said paraffin wax has a melting point of 143–150° F. and the temperature of oxidation is maintained between about 230° F. and about 250° F.

7. A composition of matter comprising dicarboxylic acids and having an acid number between about 490 and about 575 mg. KOH/g. and a saponification number-acid number ratio between about 1.2 and about 1.32 to 1, said composition being obtained by air blowing a refined paraffin wax having a melting point between about 120° F. and about 165° F. at a temperature between about 210° F. and 260° F. until the acid number of the oxidized wax is between 490 and 575 mg. KOH/g., the rate of air blowing being initially between about 0.75 and about 1.25 standard cubic feet per minute per 100 pounds of wax and being gradually increased until the rate is between about 1.5 and about 2.0 standard cubic feet per minute per 100 pounds of wax after about 90 hours of oxidation.

8. A composition of matter comprising dicarboxylic acids and having an acid number between about 490 and about 575 mg. KOH/g. and a saponification number-acid number ratio between about 1.2 and about 1.32 to 1, said composition being obtained by air blowing a refined paraffin wax having a melting point between about 120° F. and about 165° F. at a temperature between about 210° F. and about 260° F. and a pressure between atmospheric pressure and 500 pounds per square inch until the acid number of the oxidized wax is at least about 490 mg. KOH/g., the rate of air blowing being initially between about 0.75 and about 1.25 standard cubic feet per minute per 100 pounds of wax and said rate being increased as the oxidation proceeds to between about 1.5 and 2.0 standard cubic feet per minute per 100 pounds of wax at 90 hours, said last named rate being maintained to the end of the period of oxidation.

9. A composition of matter as in claim 8 in which said paraffin wax has a melting point of 143–150° F.

10. A composition of matter as in claim 8 in which said acid number is between 500 and 575 mg. KOH/g. and said saponification number-acid number ratio is between 1.22 and 1.3 to 1.

11. A saturated aliphatic alcohol ester of a mixture of dicarboxylic acids, said mixture of dicarboxylic acids being produced by air blowing a refined paraffin wax having a melting point between about 120° F. and about 165° F. at a temperature between about 210° F. and 260° F. until the acid number of the oxidized wax is between 490 and 575 mg. KOH/g., the rate of air blowing being initially between 0.75 and 1.25 standard cubic feet per minute per 100 pounds of wax and being gradually increased until the rate is between 1.5 and 2.0 standard cubic feet per minute per 100 pounds of wax after about 90 hours of oxidation, and maintaining said last named rate to the end of the oxidation.

12. A saturated aliphatic alcohol ester prepared by reacting a mixture comprising of dicarboxylic acids having a saponification number-acid number ratio between 1.2 and 1.32 to 1 with a saturated aliphatic alcohol containing between 1 and about 24 carbon atoms per molecule until the acid number of the mixture is less than about 15 mg. KOH/g., said mixture comprising dicarboxylic acids being produced by air blowing a refined paraffin wax having a melting point between about 120° F. and about 165° F. at a temperature between about 210° F. and about 260° F. until the acid number of the oxidized wax is between 490 and 575 mg. KOH/g., the rate of air blowing being initially between 0.75 and 1.25 standard cubic feet per minute per 100 pounds of wax and being gradually increased until the rate is between 1.5 and 2.0 standard cubic feet per minute per 100 pounds of wax after about 90 hours of oxidation, and maintaining said last named rate to the end of the oxidation.

13. An ester according to claim 12 in which said paraffin wax is one having a melting point of about 143–150° F. and said air blowing is continued until the oxidized wax has an acid number between 500 and 575 mg. KOH/g.

14. A saturated aliphatic alcohol ester prepared by reacting a mixture comprising of dicarboxylic acids having a saponification number-acid number ratio between 1.2 and 1.32 to 1 with between 1.1 and 1.5 equivalents of a saturated aliphatic alcohol per equivalent of acid in said mixture comprising dicarboxylic acids in the presence of an esterification catalyst until the acid number of the mixture is less than about 15 mg. KOH/g., said mixture comprising dicarboxylic acids being produced by air blowing a refined paraffin wax having a melting point between about 120° F. and about 165° F. at a temperature between about 210° F. and about 260° F. until the acid number of the oxidized wax is between 490 and 575 mg. KOH/g., the rate of air blowing being initially between 0.75 and 1.25 standard cubic feet per minute per 100 pounds of wax and being gradually increased until the rate is between 1.5 and 2.0 standard cubic feet per minute per 100 pounds of wax after about 90 hours of oxidation, and maintaining said last named rate to the end of the oxidation.

15. A method for the treatment of paraffin wax to produce an ester which comprises air blowing a refined paraffin wax at a temperature between about 210° F. and 260° F. until the acid number of the oxidized wax is between 490 and 575 mg. KOH/g., the rate of air blowing being initially between 0.75 and 1.25 standard cubic feet per minute per 100 pounds of wax and being increased until the rate is between 1.5 and 2 standard cubic feet per minute per 100 pounds of wax after about 90 hours of oxidation and maintaining said last named rate to the end of the oxidation, esterifying the resulting oxidized wax with a saturated aliphatic alcohol having between 1 and 24 carbon atoms per molecule until the acid number of the esterified product is less than about 15 mg. KOH/g.

16. A method for the treatment of paraffin wax to produce an ester which comprises air blowing a refined paraffin wax having a melting point between about 120° F. and 165° F. at a temperature between about 210° F. and 260° F. until the acid number of the oxidized wax is between 490 and 575 mg. KOH/g., the rate of air blowing being initially between 0.75 and 1.25 standard cubic feet per minute per 100 pounds of wax and being gradually increased until the rate is between 1.5 and 2.0 standard cubic feet per minute per 100 pounds of wax after about 90 hours of oxidation and maintaining said last named rate to the end of the oxidation, stripping the oxidized wax product to a temperature of 345° F. at a pressure of about 2 mm. of mercury, and esterifying one equivalent of the stripped oxidation product with between 1.1 and 1.5 equivalents of a saturated aliphatic alcohol until the acid number of the product is below about 15 mg. KOH/g.

17. A method according to claim 1 in which said produced mixture of dicarboxylic acids is esterified with a saturated aliphatic alcohol to produce the corresponding ester.

18. A method for the treatment of paraffin wax to produce a saturated aliphatic alcohol ester comprising air blowing a refined paraffin wax having a melting point between about 120° F. and about 165° F. at a temperature between about 210° F. and about 260° F. until the acid number of the oxidized wax is between 490 and 575 mg. KOH/g., the rate of air blowing being initially between 0.75 and 1.25 standard cubic feet per minute per 100 pounds of wax and being gradually increased until the rate is between 1.5 and 2.0 standard cubic feet per minute per 100 pounds of wax after about 90 hours of oxidation, and maintaining said last named rate to the end of the oxidation, to form an oxidized mixture comprising dicarboxylic acids having a saponification number-acid number ratio between 1.2 and 1.32 to 1, reacting said mixture with between 1.1 and 1.5 equivalents of a saturated aliphatic alcohol per equivalent of acid in said mixture comprising dicarboxylic acids in the presence of an esterification catalyst until the acid number of the mixture is less than about 15 mg. KOH/g.

References Cited in the file of this patent

UNITED STATES PATENTS

| | | |
|---|---|---|
| 2,054,979 | Jahrstorfer et al. | Sept. 26, 1936 |
| 2,486,454 | Zellner | Nov. 1, 1949 |
| 2,486,456 | Zellner | Nov. 1, 1949 |
| 2,581,506 | Zellner | Jan. 8, 1952 |
| 2,581,507 | Zellner et al. | Jan. 8, 1952 |
| 2,581,508 | Zellner et al. | Jan. 8, 1952 |
| 2,592,964 | Smith | Apr. 15, 1952 |
| 2,606,890 | Polly et al. | Aug. 12, 1952 |